(No Model.) 2 Sheets—Sheet 2.
J. ANGST.
POTATO PLANTING MACHINE.
No. 392,176. Patented Nov. 6, 1888.
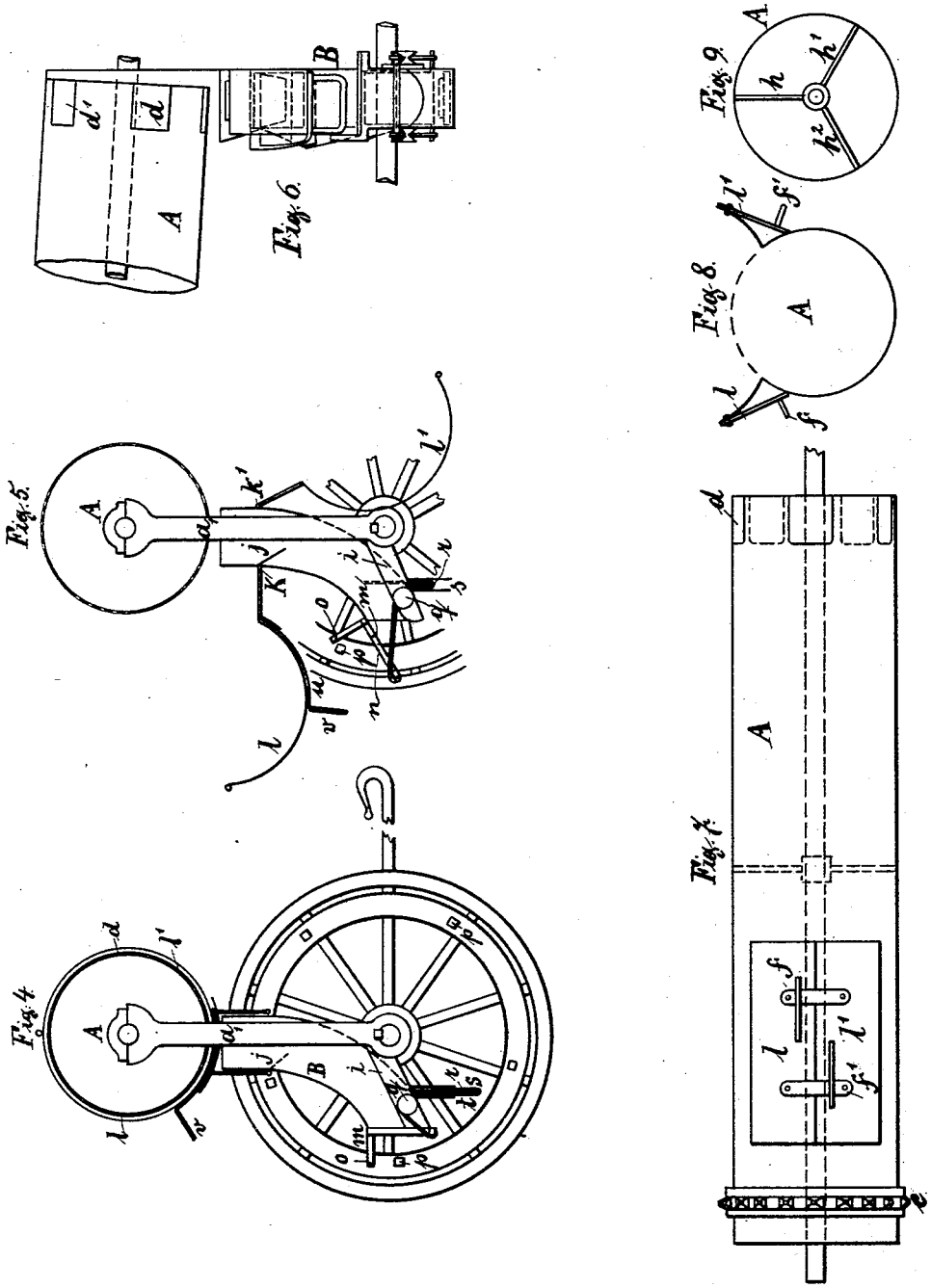
Witnesses:
Daniel Haugh.
D. W. Haynes.
Inventor:
Jacob Angst.
per Erich Bruuler.
Attorney.

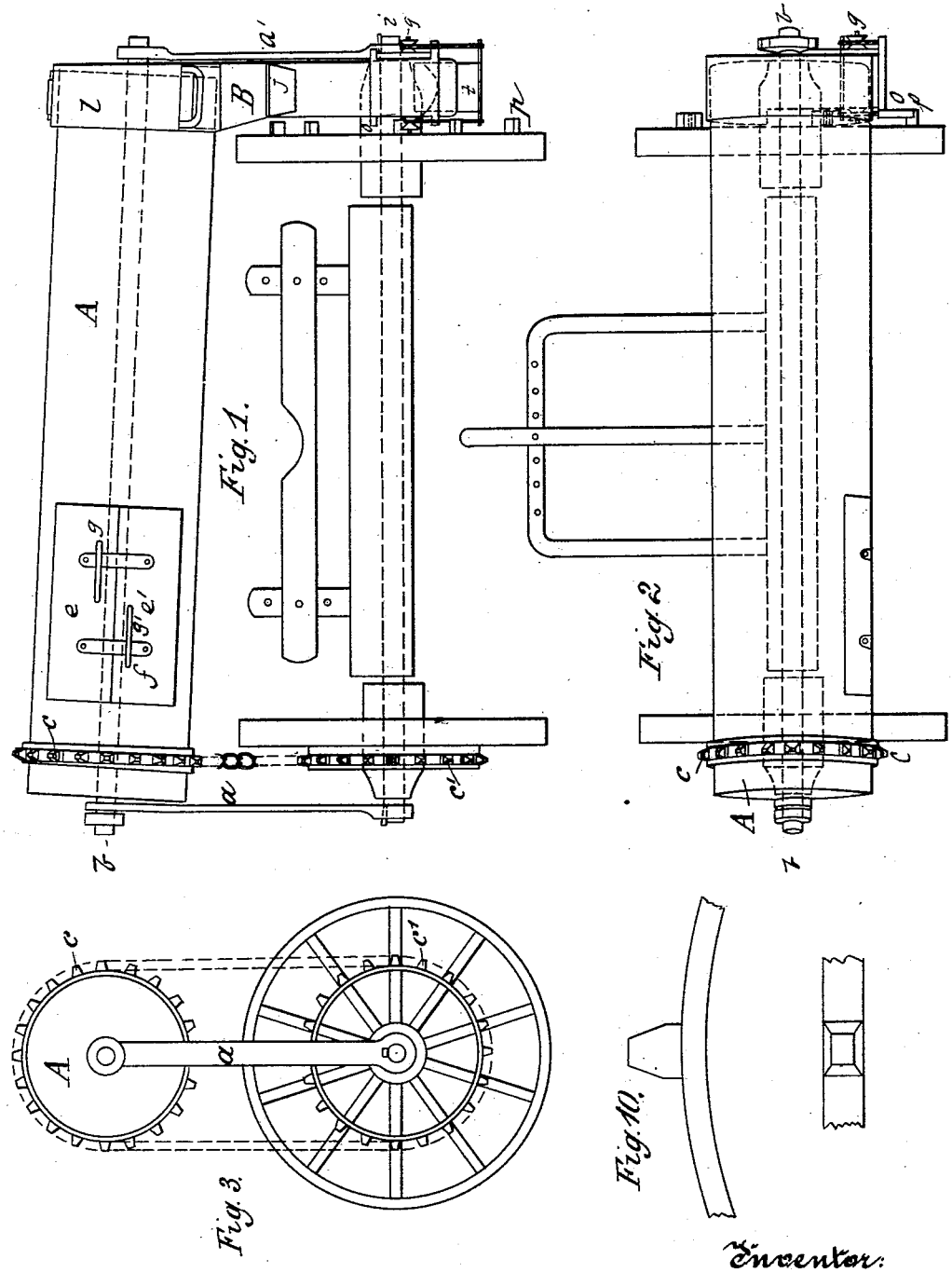

UNITED STATES PATENT OFFICE.

JAKOB ANGST, OF POHL, ZURICH, SWITZERLAND.

POTATO-PLANTING MACHINE.

SPECIFICATION forming part of Letters Patent No. 392,176, dated November 6, 1888.

Application filed May 19, 1887. Serial No. 238,804. (No model.)

*To all whom it may concern:*

Be it known that I, JAKOB ANGST, of Pohl, bei Hüntwangen, Canton Zurich, Switzerland, have invented a new and useful Potato-Planting Machine, of which the following is a specification.

This invention has reference to a potato-planting machine in the form of an apparatus to be connected to any kind of plow, which thus forms part of the planting-machine, and in this way, as well as by an arrangement for depositing one potato only at certain distances, differs from machines of the kind hitherto known.

Referring to the accompanying drawings, Figure 1 is a front elevation of the machine, which is attached to the front part of a plow; Fig. 2, a plan of the same; Fig. 3, a view of the left-hand side, with chain driving-gear; Fig. 4, a view of the right-hand side with regulator; Fig. 5, a similar side view, in which the outlet-apertures of the seed-container are uncovered; Fig. 6, a front view of the regulator as shown in Fig. 5; Fig. 7, a plan of the seed-container; Fig. 8, a section of the seed-container open for charging with seed; Fig. 9, a section of the seed-container, showing internal strengthening-stays; Fig. 10, a plan and elevation of one of the teeth of the chain driving-gear.

The machine consists of two main parts—the seed container or hopper A and regulator B—which are carried on the axle of the front part of a plow by means of rods $a\ a'$.

The seed container or hopper A is in the form of a cylinder mounted and capable of turning on a central horizontal shaft, $b$. At one end of the container A is fixed a toothed ring, $c$, equal in dimensions to and directly over another toothed ring, $c'$, bolted to the left-hand side of the plow-wheel, the one being in connection with the other through an endless chain. The right-hand end of the seed-container A is provided with five equally-distributed apertures, $d$. When the plow is drawn along, the chain driving-gear is set in action and causes the seed-container to revolve in the same direction, it performing a similar number of revolutions to the plow-wheel by reason of the two toothed rings $c\ c'$ being of equal diameter. When this movement takes place, the seed-potatoes fall into the regulator B through the apertures $d$. As these severally pass over the same in a general way, one potato would fall from each aperture $d$ every time of its passage immediately over the regulator. Thus, taking the circumference of the plow-wheel at two hundred centimeters, in one revolution of this latter, and consequently also of the container and the five apertures $d$, the seed-potatoes would be spaced at a distance of forty centimeters apart.

In order that the potatoes may during the revolving movement automatically pass to the outlet-apertures $d$, the seed-container A is mounted so as to incline downward toward the outlet end, although this inclined arrangement may be dispensed with, as the plow-wheel on this side runs in a furrow at least ten centimeters deep, and this end of the seed-container must consequently incline downward to the same extent.

The seed-potatoes are supplied to the container A through doors $e\ e'$ adjacent to the toothed ring $c$. On each door is a jointed bolt, $f$, which for the purpose of closing may be turned round so as to engage underneath the catches $g\ g'$ on the opposite door, so as to close the seed-container. When this latter is open for charging with seed-potatoes, the bolts $f$, turned round to one hundred and eighty degrees, bear against the cylinder and form a hopper.

The second of the two main parts of the machine—the regulator B—has for its object to receive any number of seed-potatoes beyond the prescribed and proper number, which may, perhaps, owing to irregularity of size, pass out of the five apertures $d$, and to conduct them singly into the furrow at the proper distance apart. This regulator consists of a trough with vertical sides leading downward from the seed-container and fixed by the rod $a'$ and its two arms $i$. The upper part of the trough stands perpendicular to the outlet of the container and forms a closed pipe. The guide $j$ projects six centimeters obliquely into the trough to prevent the potatoes from falling out and to conduct them against its rounded side. At the upper part of the trough, on the front and rear side, are jointed at $k\ k'$ two semi-cylindrical parts, $l\ l'$, which when shut up inclose the seed-container A over the length of the apertures $d$, but so that the revolving movement of the container is not interfered with. This arrangement is for the purpose of maintaining closed all the apertures $d$ with the exception of that one which is for the time immediately over the trough or regulator B, so that it is only from one aperture at a time that the potatoes can fall. At the lower end of the trough the potato-outlet is regulated by means of a flap, $n$, carried on a joint at $m$. This is worked by a lever, $o$, attached to its side and near the side of the plow-wheel, on which are arranged five projecting studs. These severally raise the lever $o$ at regular intervals simultaneously, upon which the flap $n$ is opened for a moment and a potato dropped out. When any one of the studs $p$ has released the lever $o$, the flap $n$ falls down again by reason of its own weight and closes the outlet. A little behind, at the lower end of the trough and extending over the whole width of the same, is a slot, $r$, under which is a guide, $s$. In this latter is a slide, $t$, which, by bands running over the rollers $q$ $q'$, mounted at the side of the trough, is in connection with the flap $n$. When this is raised, the slide $t$ also moves upward and shuts back all potatoes but one, so that only that particular one can pass out which happens to be between the flap $n$ and the slide $t$. When the flap $n$ falls to the closed position, the slide $t$ also falls back by its own weight and the next following potato advances up to the flap $n$. In this way only a single potato at regular intervals can pass out.

In order to prevent any exit of potatoes when the end of the furrow shall have been reached, a slide, $u$, with handle $v$, for opening and closing the same, is arranged between the container A and regulator B for this purpose, in which case the slide $u$ is closed.

When the apparatus is no longer required for the time being, it may be detached from the plow. It may also be employed in the case of swing-plows—that is, plows without any wheel-frame—by combining it with a correspondingly light one to be used for this purpose only.

What I claim as my invention, and desire to secure by Letters Patent, is—

A plow attachment serving as a potato-planting machine, consisting of seed-hopper A, with apertures $d$, and regulator B, with flap $n$ and lever $o$, substantially as described and shown.

In testimony whereof I have signed this specification in the presence of two subscribing witnesses.

JAKOB ANGST.

Witnesses:
   OTTO STUTZLER,
   AUREL HOFER.